(12) United States Patent
Dimond et al.

(10) Patent No.: US 9,240,938 B2
(45) Date of Patent: Jan. 19, 2016

(54) DISTRIBUTED SYSTEM AND METHOD FOR FLOW IDENTIFICATION IN AN ACCESS NETWORK

(71) Applicant: Calix, Inc., Petaluma, CA (US)

(72) Inventors: Brower Dimond, Santa Barbara, CA (US); Ari Sodhi, Markham (CA)

(73) Assignee: Calix, Inc., Petaluma, CA (US)

( * ) Notice: Subject to any disclaimer, the term of this patent is extended or adjusted under 35 U.S.C. 154(b) by 80 days.

(21) Appl. No.: 14/034,282

(22) Filed: Sep. 23, 2013

(65) Prior Publication Data

US 2015/0085678 A1    Mar. 26, 2015

(51) Int. Cl.
  *H04J 1/16*     (2006.01)
  *H04L 12/26*    (2006.01)
  *H04L 29/06*    (2006.01)

(52) U.S. Cl.
  CPC .............. *H04L 43/12* (2013.01); *H04L 43/026* (2013.01); *H04L 63/145* (2013.01)

(58) Field of Classification Search
  CPC ....... H04L 12/26; H04L 43/026; H04L 43/04; H04L 43/045; H04L 43/062; H04L 43/12; H04L 63/145
  See application file for complete search history.

(56) References Cited

U.S. PATENT DOCUMENTS

| | | | |
|---|---|---|---|
| 5,500,899 A | 3/1996 | Snow | |
| 6,389,468 B1 | 5/2002 | Muller et al. | |
| 6,567,861 B1 | 5/2003 | Kasichainula et al. | |
| 6,681,232 B1 | 1/2004 | Sistanizadeh et al. | |
| 6,957,269 B2 | 10/2005 | Williams et al. | |
| 7,065,779 B1 | 6/2006 | Crocker et al. | |
| 7,711,844 B2 | 5/2010 | Schuehler et al. | |
| 7,725,919 B1 | 5/2010 | Thiagarajan et al. | |
| 7,817,549 B1 * | 10/2010 | Kasralikar et al. | 370/232 |
| 7,869,428 B2 | 1/2011 | Shake et al. | |
| 8,005,012 B1 | 8/2011 | Aybay et al. | |
| 8,027,305 B1 | 9/2011 | Rogers et al. | |
| 8,046,479 B2 | 10/2011 | Einarsson et al. | |
| 8,085,775 B1 | 12/2011 | Pappu et al. | |
| 8,238,241 B2 | 8/2012 | Samuels et al. | |
| 8,310,934 B2 | 11/2012 | Hou et al. | |
| 8,339,954 B2 | 12/2012 | Dahod | |
| 8,718,131 B2 | 5/2014 | Park et al. | |
| 8,850,590 B2 | 9/2014 | Kellerman | |

(Continued)

OTHER PUBLICATIONS

"U.S. Appl. No. 13/955,864, Non Final Office Action mailed Mar. 25, 2015", 18 pgs.

(Continued)

*Primary Examiner* — Kan Yuen
(74) *Attorney, Agent, or Firm* — Schwegman Lundberg & Woessner, P.A.

(57) ABSTRACT

A system and method for tracking and adjusting packet flows through a network having a service delivery node and one or more residential services gateways. Packet flows are recognized as they pass through one or more residential services gateway and flow analytics information corresponding to the packet flows recognized in the residential services gateways are transferred from the residential gateways to the flow identification control unit. The flow analytics information received from the residential services gateways is analyzed within the flow identification control unit and traffic through one or more of the service access platform and the residential services gateways is adjusted, if necessary, as a function of the flow analytics information analyzed by the flow identification control unit.

17 Claims, 5 Drawing Sheets

(56) References Cited

U.S. PATENT DOCUMENTS

| | | | |
|---|---|---|---|
| 8,867,529 B2 | 10/2014 | Pearce | |
| 2003/0188252 A1 | 10/2003 | Kim et al. | |
| 2003/0198189 A1* | 10/2003 | Roberts et al. | 370/252 |
| 2004/0030745 A1 | 2/2004 | Boucher et al. | |
| 2004/0141530 A1 | 7/2004 | Spio | |
| 2005/0094726 A1 | 5/2005 | Park | |
| 2007/0006293 A1 | 1/2007 | Balakrishnan et al. | |
| 2007/0121615 A1 | 5/2007 | Weill et al. | |
| 2007/0220251 A1* | 9/2007 | Rosenberg et al. | 713/156 |
| 2008/0013542 A1 | 1/2008 | Youm et al. | |
| 2008/0056153 A1 | 3/2008 | Liu | |
| 2008/0201733 A1 | 8/2008 | Ertugrul et al. | |
| 2009/0022134 A1 | 1/2009 | Chun et al. | |
| 2009/0119722 A1 | 5/2009 | Versteeg et al. | |
| 2009/0241170 A1 | 9/2009 | Kumar et al. | |
| 2009/0287807 A1 | 11/2009 | Sueyoshi | |
| 2010/0043068 A1 | 2/2010 | Varadhan et al. | |
| 2010/0088756 A1 | 4/2010 | Balakrishnan et al. | |
| 2010/0103837 A1 | 4/2010 | Jungck et al. | |
| 2010/0138920 A1* | 6/2010 | Kim et al. | 726/22 |
| 2011/0022721 A1 | 1/2011 | Diab et al. | |
| 2011/0107379 A1 | 5/2011 | Lajoie et al. | |
| 2011/0110382 A1 | 5/2011 | Jabr et al. | |
| 2011/0113218 A1 | 5/2011 | Lee et al. | |
| 2011/0158146 A1 | 6/2011 | Poola et al. | |
| 2011/0216774 A1 | 9/2011 | Nevil et al. | |
| 2011/0255408 A1 | 10/2011 | Aybay et al. | |
| 2011/0295983 A1 | 12/2011 | Medved et al. | |
| 2011/0317557 A1 | 12/2011 | Siddam et al. | |
| 2012/0014282 A1 | 1/2012 | Pappu et al. | |
| 2012/0243871 A1* | 9/2012 | Huang et al. | 398/58 |
| 2012/0317276 A1* | 12/2012 | Muniraju | 709/224 |
| 2013/0024901 A1 | 1/2013 | Sharif-Ahmadi et al. | |
| 2014/0056182 A1* | 2/2014 | Chai | 370/259 |
| 2014/0269403 A1 | 9/2014 | Anghel et al. | |
| 2015/0016247 A1 | 1/2015 | Hayes et al. | |
| 2015/0036533 A1 | 2/2015 | Sodhi et al. | |

OTHER PUBLICATIONS

Baruch, Z., et al., "Embedded System for Network Flow Identification", Automation, Quality and Testing, Robotics, 2006 IEEE International Conference on, vol. 1, (May 2006), 426,429, 25-28.

"U.S. Appl. No. 13/955,864, Examiner Interview Summary mailed May 26, 2015", 3 pgs.

"U.S. Appl. No. 13/955,864, Final Office Action mailed Jul. 15, 2015", 23 pgs.

"U.S. Appl. No. 13/955,864, Response filed May 19, 2015 to Non Final Office Action mailed Mar. 25, 2015", 13 pgs.

"U.S. Appl. No. 13/941,678, Non Final Office Action mailed Aug. 28, 2015", 25 pgs.

"U.S. Appl. No. 13/955,864, Advisory Action mailed Oct. 29, 2015", 4 pgs.

"U.S. Appl. No. 13/955,864, Response filed Sep. 23, 2015 to Final Office Action mailed Jul. 15, 2015", 12 pgs.

"U.S. Appl. No. 13/955,864, Response filed Nov. 3, 2015 to Advisory Action mailed Oct. 29, 2015", 13 pgs.

* cited by examiner

DISTRIBUTED SYSTEM AND METHOD FOR FLOW IDENTIFICATION IN AN ACCESS NETWORK

BACKGROUND

A network flow is a data stream that carries information between a source and a destination. As streaming video and other timing sensitive services become more ubiquitous, it has become important to recognize and prioritize traffic based on content of each network flow. Network flow identification can be used to support Quality of Service (QoS) tools, but also can be used to reveal malware and hacking attempts disguised as normal network traffic.

Flow Identification (FI) recognizes particular flows; traffic can then be adjusted as needed based on the traffic characteristics of a given flow. Deep packet Inspection (DPI) goes further. DPI is a form of packet filtering that examines the data and portions of the header as it passes through a router. It can not only identify a flow, but inspect the flow to detect security problems such as viruses, spam, and attempted intrusions.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Conventional flow identification and Deep Packet Inspection (DPI) systems are stand-alone systems. They are either placed in line with the traffic or connected in a mirror configuration so that they receive mirrored traffic. What is described below is a way to lower the cost of flow identification and DPI by embedding flow identification and deep packet processing into network elements in such a way that the logic is federated across the access network. In one such approach, one can coordinate inspection of high line rate traffic by separating the inspection into 1) detection and isolation of traffic of interest (called "Fast Path FI") and 2) its analysis (called "Deep FI"). Such an approach increases utility and efficiency while reducing the cost of providing flow identification throughout the network by capitalizing on synergies with pre-existing network packet processing functions. In addition, the distributed nature of the approach can be hidden from the user by a centralized controller that virtualizes the distributed system into appearing like a monolithic appliance.

Figure 1:
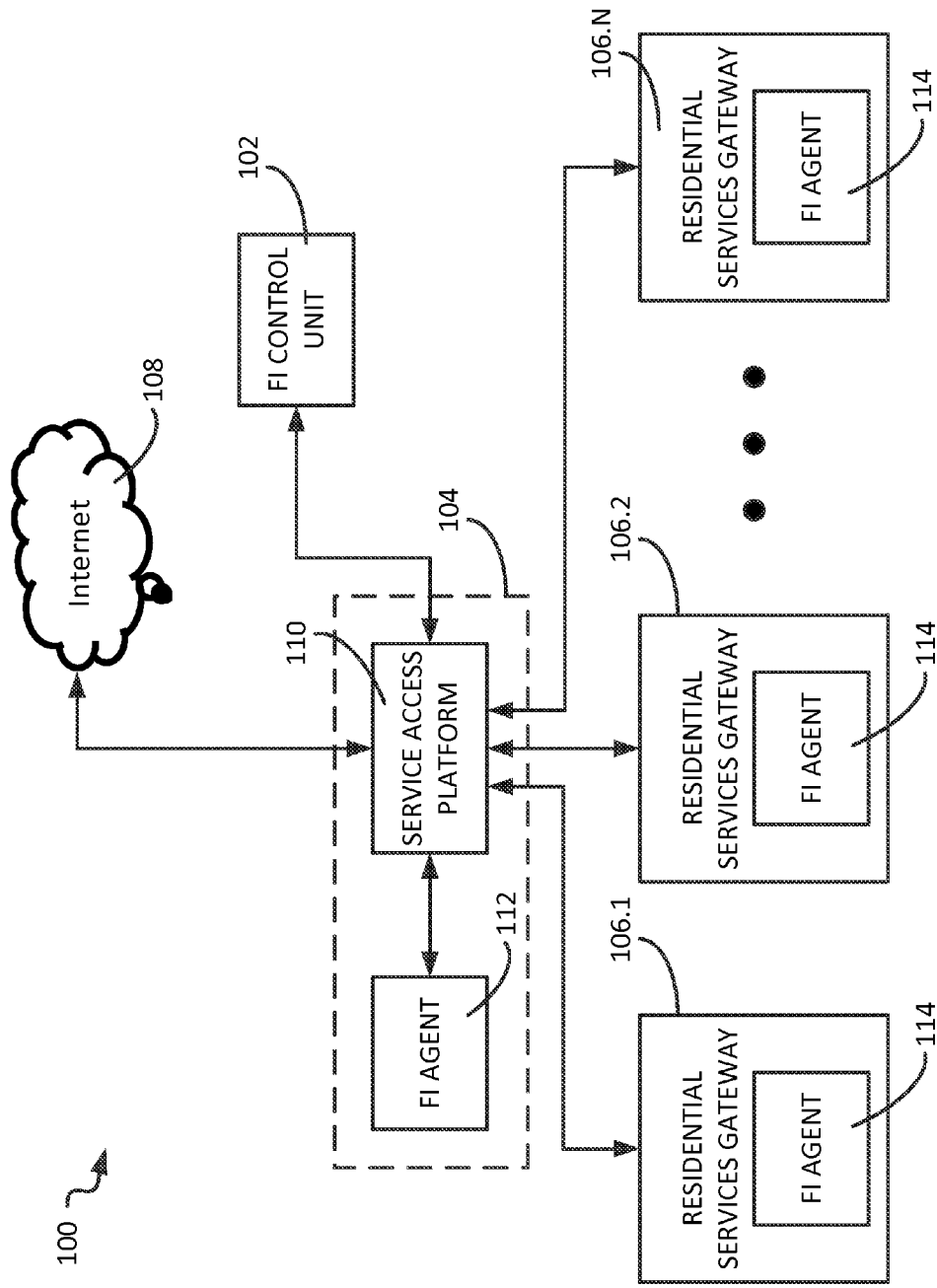
FIG. 1 illustrates a distributed system for flow identification.

A distributed system for flow identification is shown in FIG. 1. In system 100 of FIG. 1, flow identification control unit 102 is communicatively connected to an external network 108, to a service delivery node 104 and to one or more residential services gateways 106. In one embodiment, service delivery node 104 includes a service access platform 110 and a flow identification agent 112. Service Access platform 110 receives content from external network 108 and routes that content to one or more residential services gateways 106. In one embodiment, service access platform 110 delivers data and video to gateways 106 via fiber technology, allowing service providers to provide a variety of services to their household customers. In one embodiment, each FI agent 112 includes DPI analysis capability. In one embodiment, each FI agent 112 is a software-based or hardware-based agent (or combination thereof) that performs DPI functions with scope over the subscriber network that includes the gateways 106 being serviced by platform 110.

In the embodiment shown in FIG. 1, each residential services gateway 106 includes a flow identification agent 114 that operates on flows that pass through the gateway 106. In one embodiment, each FI agent 114 includes DPI analysis capability. In one embodiment, each FI agent 114 is a software-based or hardware-based agent (or combination thereof) that performs DPI functions with scope over the subscriber network.

In one embodiment, flow identification control unit 102 is connected to FI agents 114 in residential services gateways 106 and to the FI agent 112 in service delivery node 104. In one such embodiment, an application running in control unit 102 coordinates distributed DPI elements in node 104 and gateways 106 and provides a virtualized appliance view augmented with insight from multiple points in the network. This enables one to add value-added applications such as network analytics, network security, traffic engineering, application level QoS (like Netflix), application Blacklisting/Whitelisting (like BitTorrent), etc. In one such embodiment, control unit 102 coordinates the selection of the application signatures the distributed DPI elements search for in a federated manner. It also controls how the detected application signatures are treated such that they can be mirrored to other DPI appliances (e.g., FI agent 112 or one of the services gateway FI agents 114) for post processing or processed inline by one of the FI agents.

In one embodiment, system 100 is a packet flow inspection system, comprising a flow identification control unit 102, a plurality of residential services gateways 106, and a service delivery node 104 communicatively coupled to the flow identification control unit 102 and to the residential services gateways 106. Each residential services gateway 106 includes a flow identification (FI) agent 114, wherein the flow identification agent on each residential gateway analyzes packet flows through the residential services gateway and communicates the packet flow identifications to the flow identification control unit.

In one such embodiment, the service delivery node 104 is communicatively coupled to the flow identification control unit 102 and to the residential services gateways 106. The service delivery node 104 includes a service access platform 110 and a flow identification agent 112. The flow identification agent 112 identifies packet flows through the service access platform 110 and communicates the packet flow identifications to the flow identification control unit 102.

In one embodiment, the flow identification control unit 102 analyzes the flow analytics information received from the residential services gateways 106 and the service delivery node 104 and adjusts packet traffic through the service access platform 110 and the residential services gateways 106 as a function of the flow analytics information. In some embodiments, the adjustment is in the form of prioritizing some packet flows over others. Other adjustments include, for instance, isolation of particular flows, the blocking or suppression of flows (e.g., blocking or suppressing file downloads in favor of Netflix traffic, or based on a signature), applying a blacklist or whitelist, gathering additional data (via, e.g., analysis software embedded in residential services gateways) and identifying patterns for future identification and blocking.

In one embodiment, flow identification control unit 102 instructs one or more of the flow identification agents 114 in the residential services gateways to perform deep packet inspection on flows identified by the flow identification agent 112. The flow identification agents 114 perform deep packet inspection on the indicated flows and forward the results of the deep packet inspection to the flow identification control unit 102.

In one embodiment, flow identification control unit 102 instructs flow identification agent 112 to perform deep packet inspection of selected flows. The flow identification agent 112 performs deep packet inspection on the indicated flows and forwards the results of the deep packet inspection to the flow identification control unit 102.

In one embodiment, flow identification control unit 102 instructs flow identification agent 112 to perform fast path flow identification inspection of flows. The flow identification agent 112 performs inspection on flows passing through service delivery node 104 and forwards the results of the inspection to the flow identification control unit 102.

In one embodiment, a distributed DPI messaging protocol is used to coordinate DPI handling through the distributed system. The distributed DPI messaging protocol is a messaging protocol used by the controller 102 and the agents (112, 114) to coordinate DPI handling through the distributed system. This includes coordination of what application/traffic signatures to search for, and notification of detection of an application signature of interest.

In some embodiments, Application/Traffic signatures of interest change over time and locality. In one such embodiment, each signature is based on a definition that characterizes the TCP/IP five tuple, state-full packet flow pattern (i.e. session initiation, session body and session termination), and packet content including application header and payload. The application/traffic signatures can range from congestion patterns (service, interface), to security threats such as malware, or network attacks such as DoS, or application signatures such as Netflix or torrent.

In one embodiment, each FI agent 112 performs a first pass flow identification, termed "Fast Pass FI Agent". In one such embodiment, flows are categorized into flow type and origin. In some embodiments, this level of flow identification is sufficient for applications such as Traffic Engineering and Network Analytics but not for applications that require deeper packet inspection like that involved in protection from Viruses, Worms, and Trojans.

In one embodiment, a DPI agent is installed in one or more of agents 112 and 114. This type of agent has deep packet inspection capabilities and is often used on a second pass of inspection. A Fast Pass FI Agent is used to initially identify a flow of interest in one location in the network, passes the flow identity to the Control Unit 102, then the Control Unit 102 will message a Deep FI Agent for deeper inspection.

In some embodiments, a Distributed FI Messaging Protocol is used to pass FI information between agents 112 and 114 and control unit 102. Distributed FI is a comprehensive messaging system that is used to pass FI information between agents and the controller. In one embodiment, the protocol includes a cut-through mode for fast message passing between fast-path FI agents and deep FI agents or between FI agents and an external actor where latency through the control unit 102 would be a problem.

Figure 2:
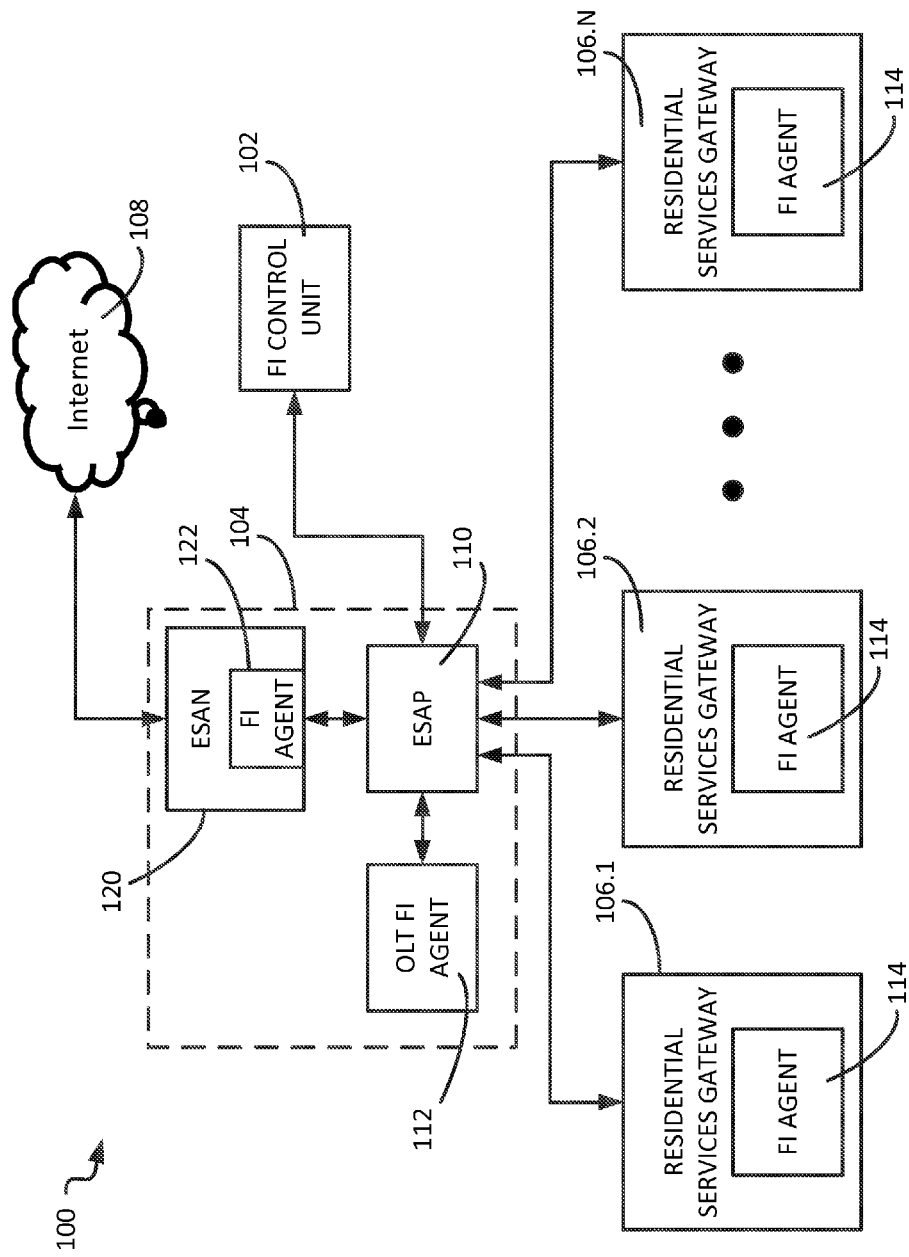
FIG. 2 illustrates another distributed system for flow identification.

In one embodiment, such as is shown in FIG. 2, service delivery node 104 includes a service access node 120 connected between the service access platform 110 and external network 108. In one such embodiment, the service access node 120 operates to pass traffic from the external network 108 to the service access platform 110 and from the service access platform 110 to the external network 108. In one such embodiment, service access node 120 includes an FI agent 122, wherein FI agent 122 reports FI analytics information from the service access node 120 to the flow identification control unit 102. In some such embodiments, service access node 120 is a stand-alone system such the Network Analytics products made by Sandvine and by Procera Networks. In some such embodiments, a separate software-based FI agent 122 runs on the standalone device.

A method of adjusting network traffic will be discussed next. As in FIG. 1, network 100 has a service access platform 110 connected to one or more residential services gateways 106 and to a flow identification control unit 102. The service access platform distributes packet flows to the residential service gateways. The packet flows are adjusted by, first, recognizing, within each residential services gateway, packet flows passing through the residential services gateway. Next flow analytics information corresponding to the packet flows recognized in the residential services gateways is transferred from the residential gateways to the flow identification control unit. At the flow identification control unit, the flow analytics information received from the residential services gateways is analyzed and the traffic is adjusted through the service access platform and the residential services gateways as a function of the flow analytics information analyzed by the flow identification control unit 102.

Figure 3:
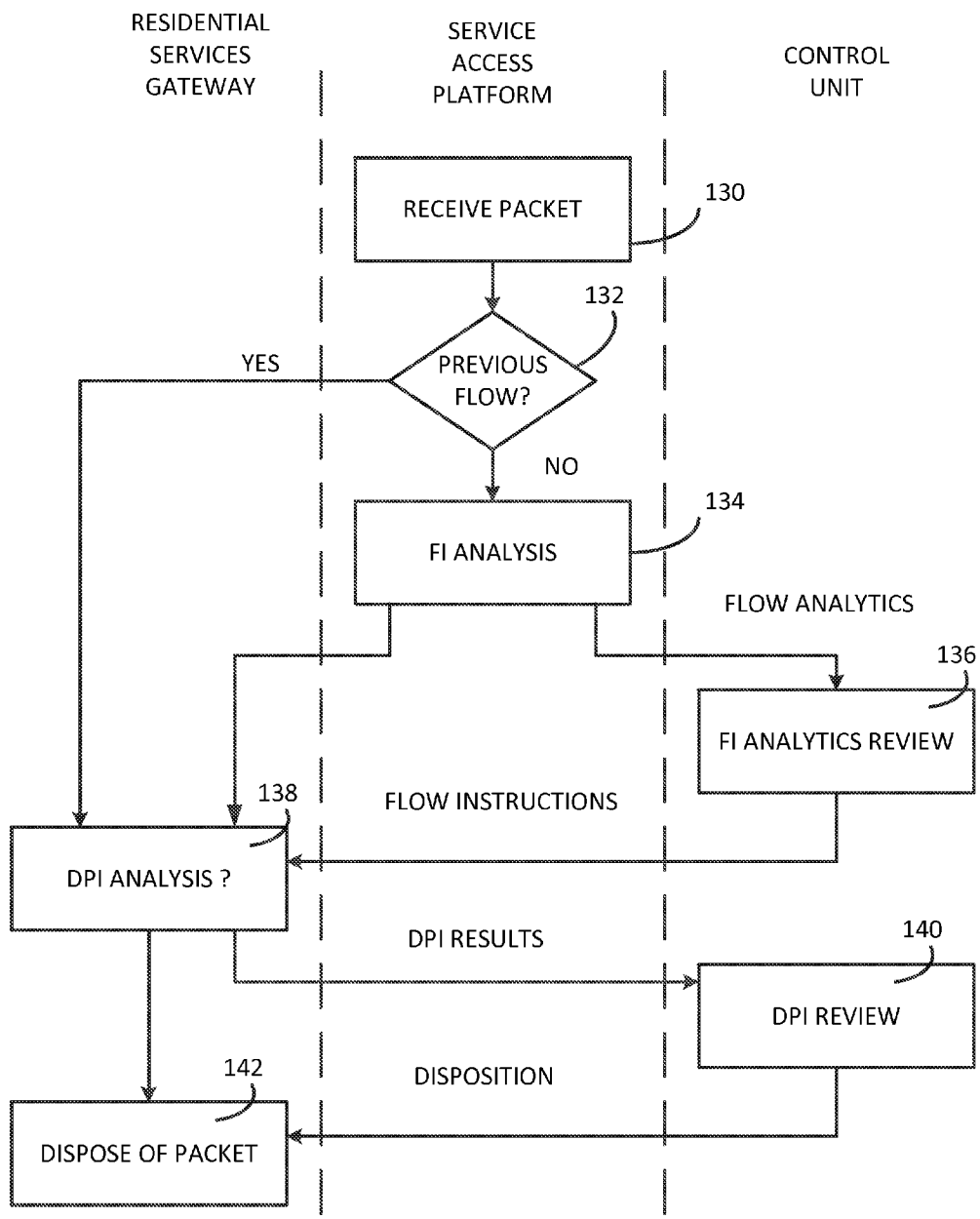
FIG. 3 illustrates a method of analyzing flows.

One example embodiment is shown in FIG. 3. In the example embodiment shown in FIG. 3, service access platform 110 receives a packet at 130 and determines, at 132, whether the packet is part of a previously recognized packet flow. If not, control moves to 134, where a first pass flow identification is performed. The packet is then sent to the destination residential gateway 106 while the results of the flow identification are sent to control unit 102 for review at 136. A message sent, at 138, from control unit 102 to the residential gateway 106 that is to receive the flow. In one such embodiment, the residential gateway 106 includes a DPI agent program and, if instructed to do so by the message from control unit 102, the DPI agent program performs a deep packet inspection of the packet at 138. DPI results are forwarded to control unit 102 for review at 140. Control unit 102 reviews the DPI results and determines whether to dispose of the packet. If so, gateway 106 disposes the packet at 142.

Figure 4:
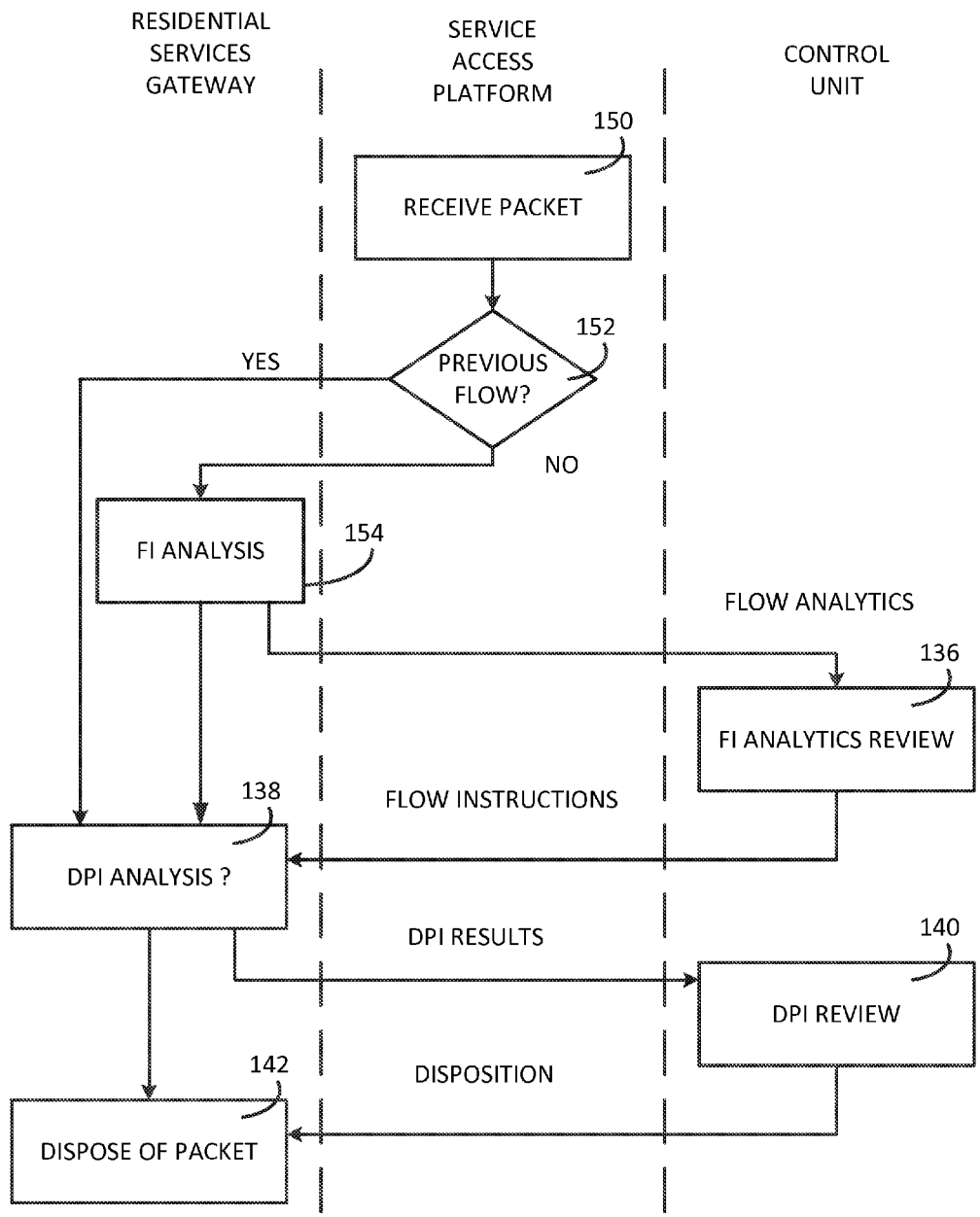
FIG. 4 illustrates another method of analyzing flows.

Another example embodiment is shown in FIG. 4. In the example embodiment shown in FIG. 3, service access platform 110 receives a packet at 150 and determines, at 152, whether the packet is part of a previously recognized packet flow. Meanwhile, the packet is then sent to the destination residential gateway 106. If the packet is not part of a previously recognized packet flow, control moves to 154 where a first pass flow identification is performed. The results of the flow identification are sent to control unit 102 for review at 136. A message sent, at 138, from control unit 102 to the residential gateway 106 that is to receive the flow. In one such embodiment, the residential gateway 106 includes a DPI agent program and, if instructed to do so by the message from control unit 102, the DPI agent program performs a deep packet inspection of the packet at 138. DPI results are forwarded to control unit 102 for review at 140. Control unit 102 reviews the DPI results and determines whether to dispose of the packet. If so, gateway 106 disposes the packet at 142.

A method of performing deep packet inspection (DPI) of network traffic in a network having a service delivery node 104, one or more residential services gateways 106 and a flow identification (FI) control unit 102 will be discussed next.

Flows passing through the residential services gateways 106 are recognized within the residential services gateways and flow analytics information corresponding to the packet flows recognized in the residential services gateways are transferred from the residential gateways to the flow identification control unit 102. Flows passing through the residential services gateways 106 are recognized within the service access platform and flow analytics information corresponding to the packet flows recognized in the service access platform are transferred from the service access platform to the flow identification control unit 102.

Flow identification control unit analyzes the flow analytics information received from the residential services gateways and the service delivery node and selects, as a function of the flow analytics information analyzed by the flow identification control unit 102, a selected flow on which to perform deep packet inspection and the unit 104 or 106 that is to perform the deep packet inspection on the selected flow. Deep packet inspection of the selected flow is then performed at the selected FI agent.

In one such embodiment, analyzing the flow analytics information includes aggregating the flow analytics information received from the residential services gateways and the service delivery node to form a representation of the packet flows throughout the network.

Figure 5:
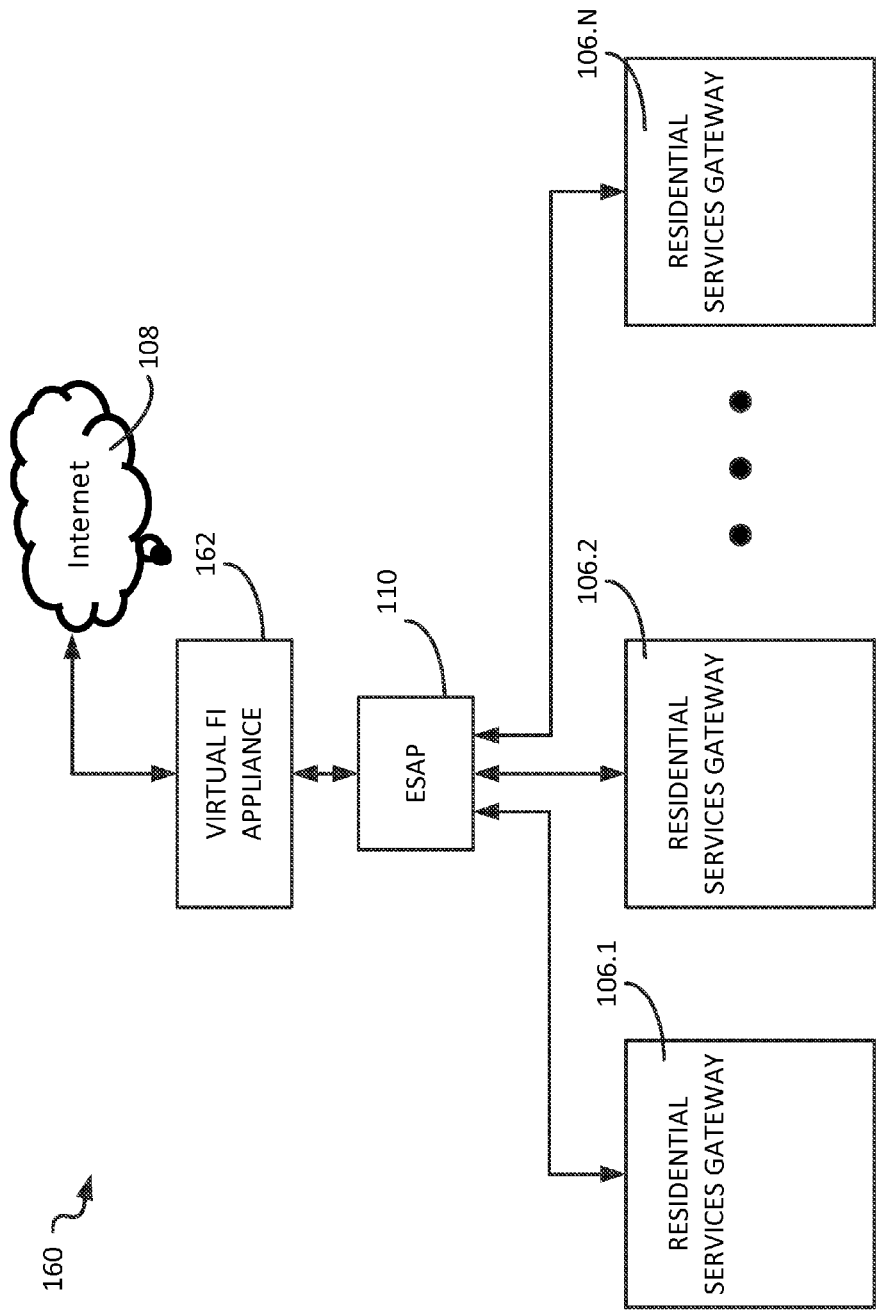
FIG. 5 illustrates a virtual appliance representation of a virtual flow identification system.

In one embodiment, analyzing the flow analytics information includes displaying the flow analytics information received from the residential services gateways and from the service delivery node as packet flows through a single virtual network appliance, such as the network representation 160 shown in FIG. 5. In the example network representation 160 shown in FIG. 5, network flows through the network 100 are shown as if they were being analyzed by virtual flow identification appliance 162, instead of by the FI agents distributed throughout network 100.

In one embodiment, flow identification (FI) agents operating in the residential services gateways and the service access platform operate to recognize flows passing through their corresponding devices and the flow identification control unit and the FI agents use a distributed DPI messaging protocol to coordinate DPI throughout the network. In one such embodiment, this DPI coordination includes detailing the signatures of applications to be analyzed. In another such embodiment, this DPI coordination includes detailing a response when a particular signature is detected. In another such embodiment, this DPI coordination includes detailing traffic to be analyzed.

In one embodiment, as is shown in FIG. 2, the service delivery node 104 includes a service access node 120 connected to the service access platform 110, wherein the service network node is connected to an external network 108 and operates to pass traffic from the external network 108 to the service access platform 110 and from the service access platform 110 to the external network 108, wherein the service access node includes an FI agent, wherein the FI agent reports FI analytics information from the service access node to the flow identification control unit 108, wherein performing deep packet inspection of the selected flow at the selected FI agent includes performing deep packet inspection in the FI agent of the service access node. The results are displayed as if all flow analysis and deep packet inspection are performed in virtual flow identification appliance 162.

In one embodiment, control unit 102 decides where to perform packet flow analysis. In one such embodiment, unit 102 performs analysis as close to the subscriber as possible. Thus, a preference is given to performing flow analysis at the gateway 106 over the service access platform 110, and at the service access platform 110 over service access node 120. Decisions can, therefore, be made as close to the subscriber as possible.

In some embodiments, each agent has a profile that looks for certain events or conditions. For example, one agent may note "Netflix flow has started", "Netflix flow has stopped", and "Skype flow has started". Real-time information on the start and stop of certain packet flows can be advantageous in recognizing and taking action on security issues related to the packet flows.

What has been discussed above is the distribution of flow analysis across two or more appliances in a residential gateway services network. Such an approach takes advantage of the use of inexpensive software or hardware-based flow inspection applications to analyze packet flows through network 100 under control of a flow identification control unit 102. The results can be displayed as if being performed by one or more virtual network appliances for ease of understanding. An advantage of such an approach is that you avoid having to split out or mirror network traffic to perform analysis of particular packet flows. In addition, flow analysis can be tuned to the needs of network 100. That is, various degrees of packet inspection can be used based on the agent installed and the security needs of the system. In addition, analysis can be performed real-time, with the results used to adjust packet flow to support desired quality of service parameters.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:

1. A packet flow inspection system, comprising:
 a flow identification control unit;
 a plurality of residential services gateways, wherein each residential services gateway includes a flow identification (FI) agent, wherein the flow identification agent on each residential gateway analyzes packet flows through the residential services gateway associated with the flow identification agent and communicates the packet flow identifications to the flow identification control unit; and
 a service delivery node communicatively coupled to the flow identification control unit and to the residential services gateways, wherein the service delivery node includes a service access platform and a flow identification agent, wherein the flow identification agent of the service access platform identifies packet flows through the service access platform and communicates the packet flow identifications to the flow identification control unit;

wherein the flow identification control unit analyzes the flow analytics information received from the residential services gateways and the service delivery node and stores the analysis in memory;

wherein the service delivery node further includes a service access node connected to the service access platform, wherein the service access node is connected to an external network and operates to pass traffic from the external network to the service access platform and from the service access platform to the external network; and wherein the service access node includes an FI agent, wherein the FI agent reports FI analytics information from the service access node to the flow identification control unit.

2. The system of claim 1, wherein analyzing includes transmitting commands to the service access platform to adjust traffic through the service access platform as a function of the flow analytics information.

3. The system of claim 1, wherein analyzing includes transmitting commands to one or more of the residential services gateways to adjust traffic through the residential services gateways as a function of the flow analytics information.

4. The system according to claim 1, wherein the service access platform flow identification agent is an optical line terminal (OLT) flow identification agent.

5. The system according to claim 1, wherein the service access platform flow identification agent is a Fast Path FI agent.

6. A deep packet inspection system, comprising:
a flow identification control unit;
a plurality of residential services gateways, wherein each residential services gateway includes a flow identification (FI) agent, wherein the flow identification agent on each residential gateway identifies flows and communicates the flow identifications to the flow identification control unit; and
a service delivery node communicatively coupled to the flow identification control unit and to the residential services gateways, wherein the service delivery node includes a service access platform and a flow identification agent, wherein the flow identification agent of the service access platform identifies flows through the service access platform and communicates the flow identifications to the flow identification control unit;
wherein the flow identification control unit instructs one or more of the flow identification agents in the residential services gateways to perform deep packet inspection of flows identified by the service delivery node flow identification agent;
wherein the flow identification agents performing deep packet inspection forward the results of the deep packet inspection to the flow identification control unit;
wherein the service delivery node further includes a service access node connected to the service access platform, wherein the service network node is connected to an external network and operates to pass traffic from the external network to the service access platform and from the service access platform to the external network; and wherein the service access node includes an FI agent, wherein the FI agent reports FI analytics information from the service access node to the flow identification control unit.

7. The system according to claim 6, wherein the service access platform flow identification agent is an optical line terminal (OLT) flow identification agent.

8. The system according to claim 6, wherein the service access platform flow identification agent is a Fast Path FI agent.

9. The system of claim 6, wherein the flow identification agent categorizes the flows by flow type, source, and destination.

10. The system of claim 6, wherein the flow identification control unit aggregates the flows received from the residential services gateways to form a representation of packet flows throughout a network.

11. The system of claim 6, further comprising a display device to display the flows received from the residential services gateways and from the service access platform as packet flows through a single network appliance.

12. The system of claim 6, wherein flow identification (FI) agents operating in the residential services gateways and the service access platform operate to recognize flows passing through their corresponding devices and wherein the flow identification control unit and the FI agents use a distributed deep packet inspection messaging protocol to coordinate deep packet inspection throughout a network.

13. The system of claim 12, wherein the flow identification control unit and the FI agents use a distributed deep packet inspection messaging protocol to coordinate deep packet inspection throughout a network includes detailing the signatures of applications to be analyzed.

14. The system of claim 13, wherein the flow identification control unit and the FI agents use a distributed deep packet inspection messaging protocol to coordinate deep packet inspection throughout a network includes detailing the signatures of applications to be analyzed includes detailing a response when a particular signature is detected.

15. The system of claim 12, wherein the flow identification control unit and the FI agents use a distributed deep packet inspection messaging protocol to coordinate deep packet inspection throughout a network includes detailing traffic to be analyzed.

16. The system of claim 6, wherein the flow identification control unit tasks one of the residential services gateways to perform deep packet inspection of one of the flows through the residential services gateway and receives the results of the deep packet inspection.

17. A deep packet inspection (DPI) system, comprising:
a flow identification control unit;
a plurality of residential services gateways, wherein each residential services gateway includes a flow identification (FI) agent, wherein the flow identification agent on each residential gateway identifies flows and communicates the flow identifications to the flow identification control unit; and
a service delivery node communicatively coupled to the flow identification control unit and to the residential services gateways, wherein the service delivery node includes a service access platform and a flow identification agent, wherein the flow identification agent of the service access platform identifies flows through the service access platform and communicates the flow identifications to the flow identification control unit;
categorize, using the flow identification agent, the flows by flow type, source, and destination;

wherein the flow identification control unit instructs one or more of the flow identification agents in the residential services gateways to perform deep packet inspection of flows identified by the service delivery node flow identification agent using one of the flow type, source, and destination corresponding with the each of the flows;

wherein the flow identification agents performing deep packet inspection forward the results of the deep packet inspection to the flow identification control unit;

wherein the flow identification control unit aggregates the flows received from the residential services gateways to form a representation of packet flows throughout the network; and wherein the flow identification control unit displays the aggregated flows as packet flows through a single network appliance;

wherein the service delivery node further includes a service access node connected to the service access platform, wherein the service network node is connected to an external network and operates to pass traffic from the external network to the service access platform and from the service access platform to the external network; and wherein the service access node includes an FI agent, wherein the FI agent reports FI analytics information from the service access node to the flow identification control unit.

* * * * *